United States Patent [19]

Lund

[11] 4,370,093
[45] Jan. 25, 1983

[54] SPIKE ORIENTER

[75] Inventor: Raymond R. Lund, West Columbia, S.C.

[73] Assignee: Canron Corporation, Columbia, S.C.

[21] Appl. No.: 95,795

[22] Filed: Nov. 19, 1979

[51] Int. Cl.³ .............................................. B65H 9/10
[52] U.S. Cl. .................................... 414/779; 198/395; 227/113; 227/148
[58] Field of Search ............... 198/395, 399, 376, 379; 227/6, 119, 148, 113, 120, 107; 193/44, 45; 144/32; 414/754, 757, 781, 783, 784, 779, 744 B, 744

[56] References Cited

U.S. PATENT DOCUMENTS

| | | | |
|---|---|---|---|
| 2,993,208 | 7/1961 | Cast et al. | 227/113 X |
| 3,115,234 | 12/1963 | Eleftherion et al. | 198/379 |
| 3,313,943 | 4/1967 | Sager | 414/754 X |
| 3,344,900 | 10/1967 | Drop | 198/395 |
| 3,367,476 | 2/1968 | Aronstein et al. | 198/376 |
| 3,503,527 | 3/1970 | Devol | 414/783 X |

Primary Examiner—Lawrence J. Oresky
Attorney, Agent, or Firm—Wenderoth, Lind & Ponack

[57] ABSTRACT

A system for orientating a railway spike of the type having a head provided with a lip which projects at one location from the head. It is important to ensure that the lip is aligned in a predetermined angular position so that when the spike is driven in a tie by means of an automatic spike driver the lip will overlie the rail flange. The system involves a holding device, such as an electromagnet for holding a spike and a drive motor rotating the holding device and spike until a light path defined between a stationary source and detector is interrupted by the lip of the spike and at which point the drive motor is deenergized, in addition, a switch indicating a complete 90° rotation of the spike is also activated so that one of the flat faces of the square section shank will face the rail.

8 Claims, 5 Drawing Figures

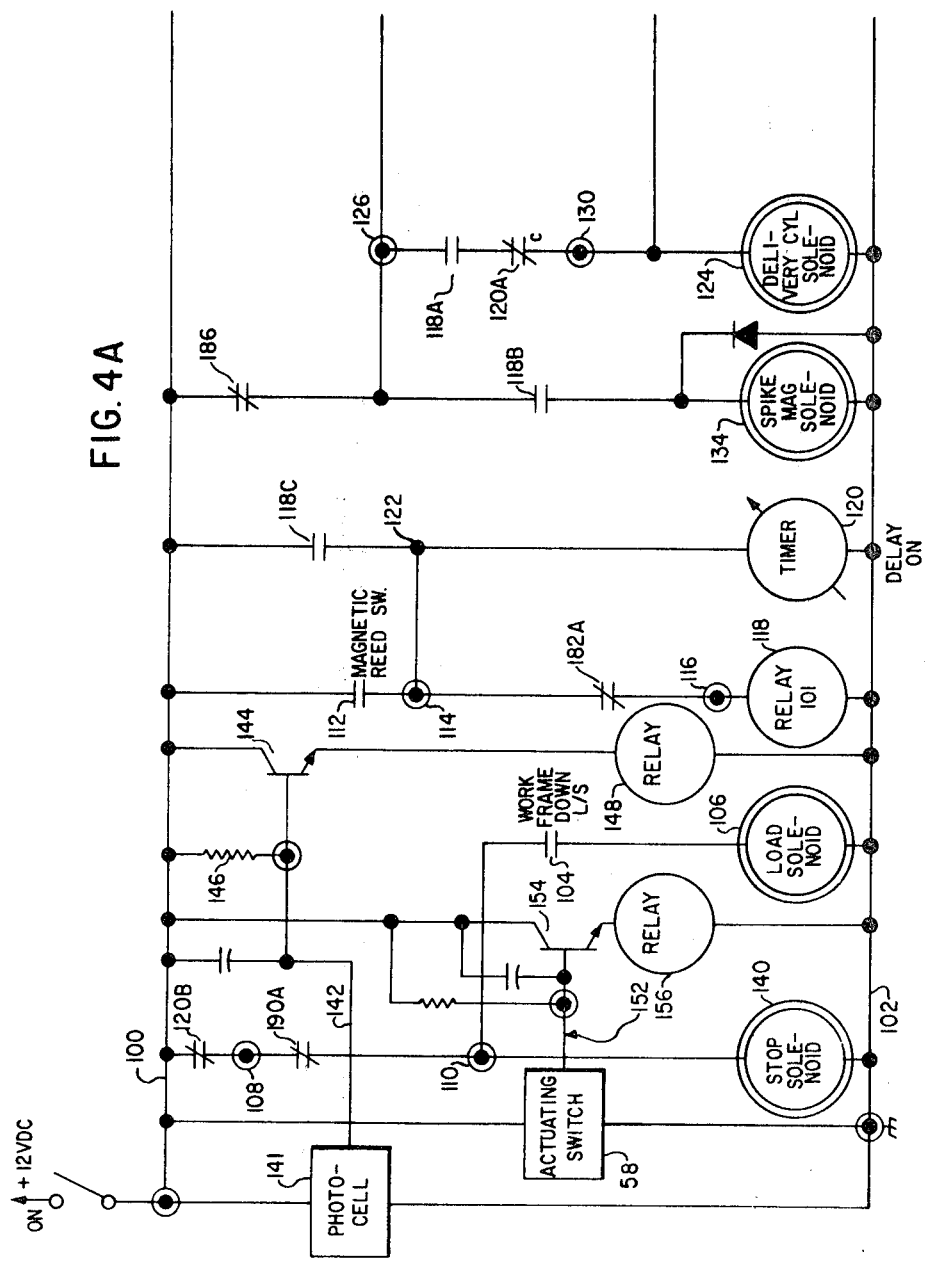

SPIKE ORIENTER

BACKGROUND OF THE INVENTION

In U.S. Pat. No. 4,131,067 of Newman et al which issued on Dec. 26, 1978 there is disclosed an automatic machine for driving spikes through holes in rail tie plates into rail ties to secure rails to the ties. The spikes are fed automatically from a hopper, in which the spikes are randomly stored, to a spike gripping mechanism which holds the leading spike in position directly above a guide tube mounted on a vertically movable frame which also carries a hole sensing device for finding the tie plate holes and a setter and drive head for driving a spike retained in the setter through the sensed tie plate hole. When the vertically movable frame is moved to the "up" position, the spike gripping mechanism is deactivated to release the held spike which falls down the guide tube into the setter where it is retained until such time as the hole is sensed whereupon the drive head is actuated.

A problem associated with this automatic spike driving machine is that of ensuring the correct orientation of the spike heads. As those familiar with the art will appreciate, the head of a spike protrudes in one lateral direction more than any other so that a considerable lip is formed for engaging the rail flange and securing the rail when the spike has been driven into the tie. It is imperative, therefore, that this lip projects inwardly towards the rail as the spike is being held in the setter so that, when the drive head is operated, the underside of the lip will engage the rail flange as designed. Furthermore, the spike should be accurately oriented to prevent jamming in the guide tube.

SUMMARY OF THE PRESENT INVENTION

It is therefore a primary object of the present invention to provide a spike orientation system which orientates the spikes correctly for use in an automatic spike driving machine.

According to the present invention, this is achieved using a light transmitter and receiver set up so that the light beam is adjacent an electromagnet which holds the spike head. The electromagnet and, therefore, the spike held by the magnet can be rotated by an electric motor to a location in which the projecting lip of the spike head interrupts the light beam. This indicates that the spike is in the correct orientation and a signal derived at the light receiver causes the motor to stop rotating the spike.

In a preferred embodiment, this interruption of the light beam indicates that generally the correct orientation has been achieved but rotation is continued until a limit switch is actuated after a predetermined angular rotation of the spike. The angular rotation affected is a multiple of 90° so that the spike is rotated through multiples of 90°. This has the advantage that the head section of the spike can be lined up accurately with respect to the guide tube to prevent jamming of the spikes in the tube.

BRIEF DESCRIPTION OF THE DRAWINGS

FIGS. 4a and 4b together form a diagram of the circuitry for ensuring the correct sequence of operation of the system.

DETAILED DESCRIPTION OF THE PREFERRED EMBODIMENT

Figure 1:
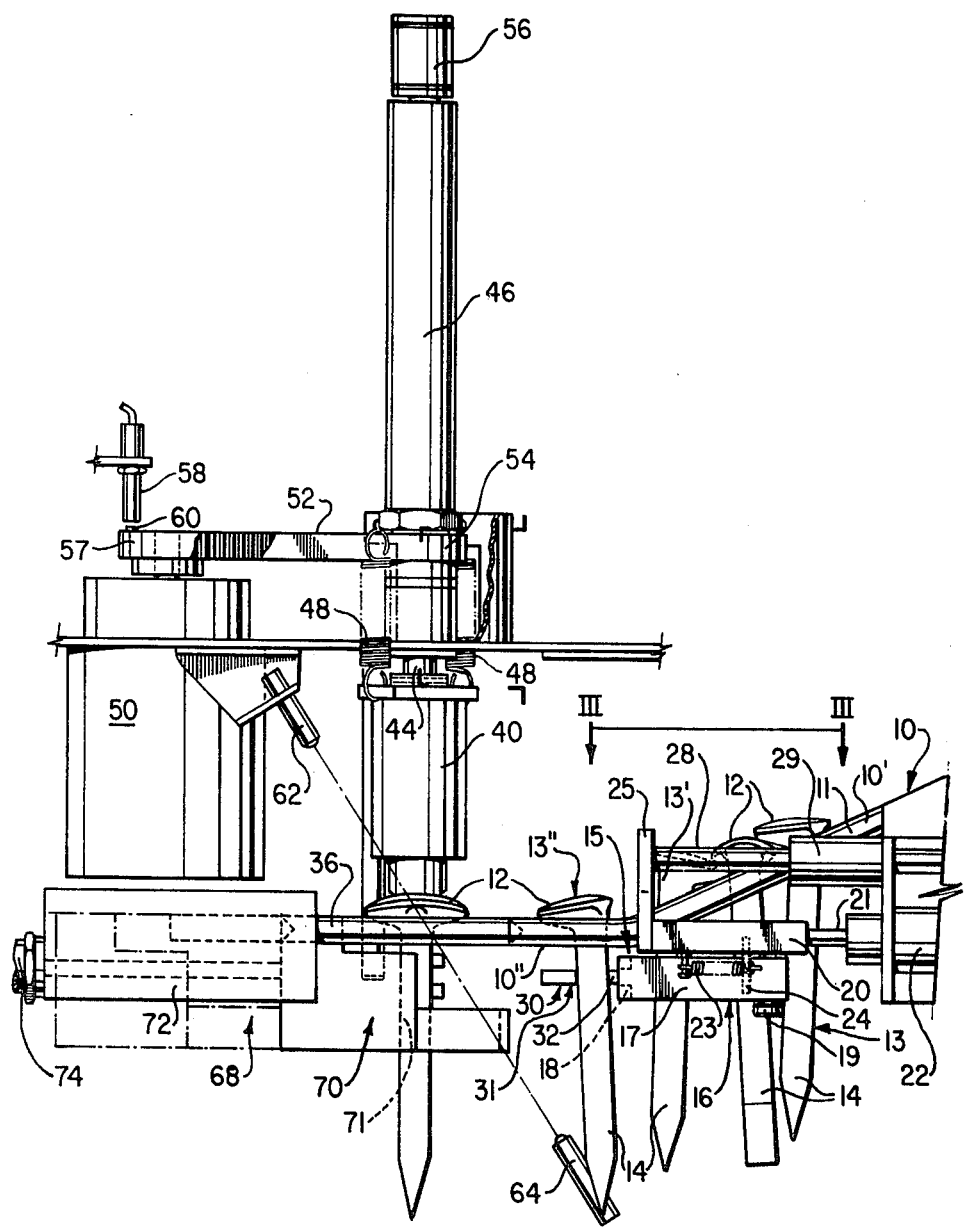
FIG. 1 is a schematic view of the spike orientation system of the present invention showing a spike being oriented with its lip projecting outwardly from the drawing.

With reference firstly TO FIG. 1, the lower part of a guide chute 10 is shown at the right hand side of the drawing. Chute 10 has a main sloping portion 10' and a terminal horizontal portion 10". Chute 10 comprises a pair of spaced parallel guide rods 11 which hold the heads 12 of spikes 13 with the shanks 14 of the spikes extending generally vertically between the rods. In this way, the spikes can be gravity fed from a hopper (not shown) to a double gate mechanism referenced generally 15. The double gate mechanism 15 comprises a movable gate 16 which is generally L-shaped with one leg 17 of the L extending generally in the direction of the guide rods and other leg 18 of the L extending laterally towards the guide rods to present a barrier which engages the shank 14 of the second leading spike 13' of the spikes on the guide chute.

The movable gate 16 is pivotally connected by means of a bolt 19 to a block 20 connected to the end of a piston rod 21 of a pneumatic cylinder 22. A tension spring 23 is secured at one end to the outer side of the leg 17 of gate and is secured at the other end to the underside of the block 20. Any appropriate fastening means may be used for securing the spring ends. The operation of the tension spring is such that it biases the gate 16 to pivot about bolt 19 clockwise looking at FIG. 3. A stop 24 mounted on gate 16 projects above the lower surface of block 20 for engagement with the outer edge of block 20 to limit the degree of rotation in the clockwise direction to that shown.

Extending upwardly from the front of the block 20 is a wiper member 25. The wiper 25 includes a horizontal portion 26 extending across the top of the rails 11 just at the junction of the terminal horizontal portion 10" of chute 10 and the sloping portion 10'. A guide rod 28 extending parallel to the piston rod 21 is connected to the wiper 25 and is slidable in a sleeve 29. The horizontal wiper portion 26 engages the head of the second leading spike 13'.

The leading spike 13" is retained by a second gate 30 at the location where the guide chute becomes horizontal. Gate 30 is also L-shaped with a transverse arm 31 extending across the guide rods and another arm 32 extending back along parallel to the guide rods. The gate 30 is pivotally mounted at the junction of the two arms and a spring 34 connected to the free end of arm 32 biases the gate 30 in a counter clockwise direction, a stop 35 defining the stable position of arm 31.

Figure 2:
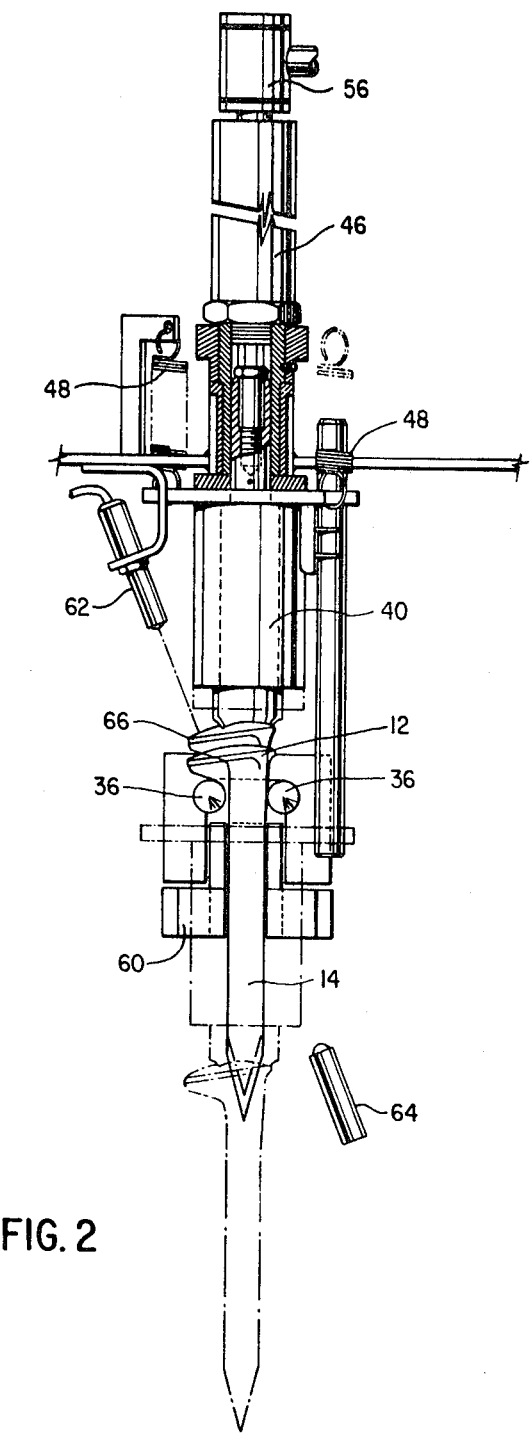
FIG. 2 is a view of part of the system of FIG. 1 taken on line 2—2 of FIG. 1.

Extending in alignment with the horizontal portion of the guide rods 11 forming the lower portion of the chute 10 are two guide rods 36 which, as seen in both FIGS. 1 and 2, serve to hold the leading spike 13" in a leading area once it has been indexed from the position where it is held by the second gate 30. The means for indexing the spikes comprises the pneumatic cylinder 22 and piston 21. As the piston is extended this causes the gate 16 to open and horizontal wiper portion 26 to move forward permitting the second leading spike 13' to move under the action of gravity and, at the same time, the second gate 30 is opened and the leading spike 13″ is pushed along the horizontal portion of the chute 10 onto the guide rods 36 and into the loading area.

Figure 3:
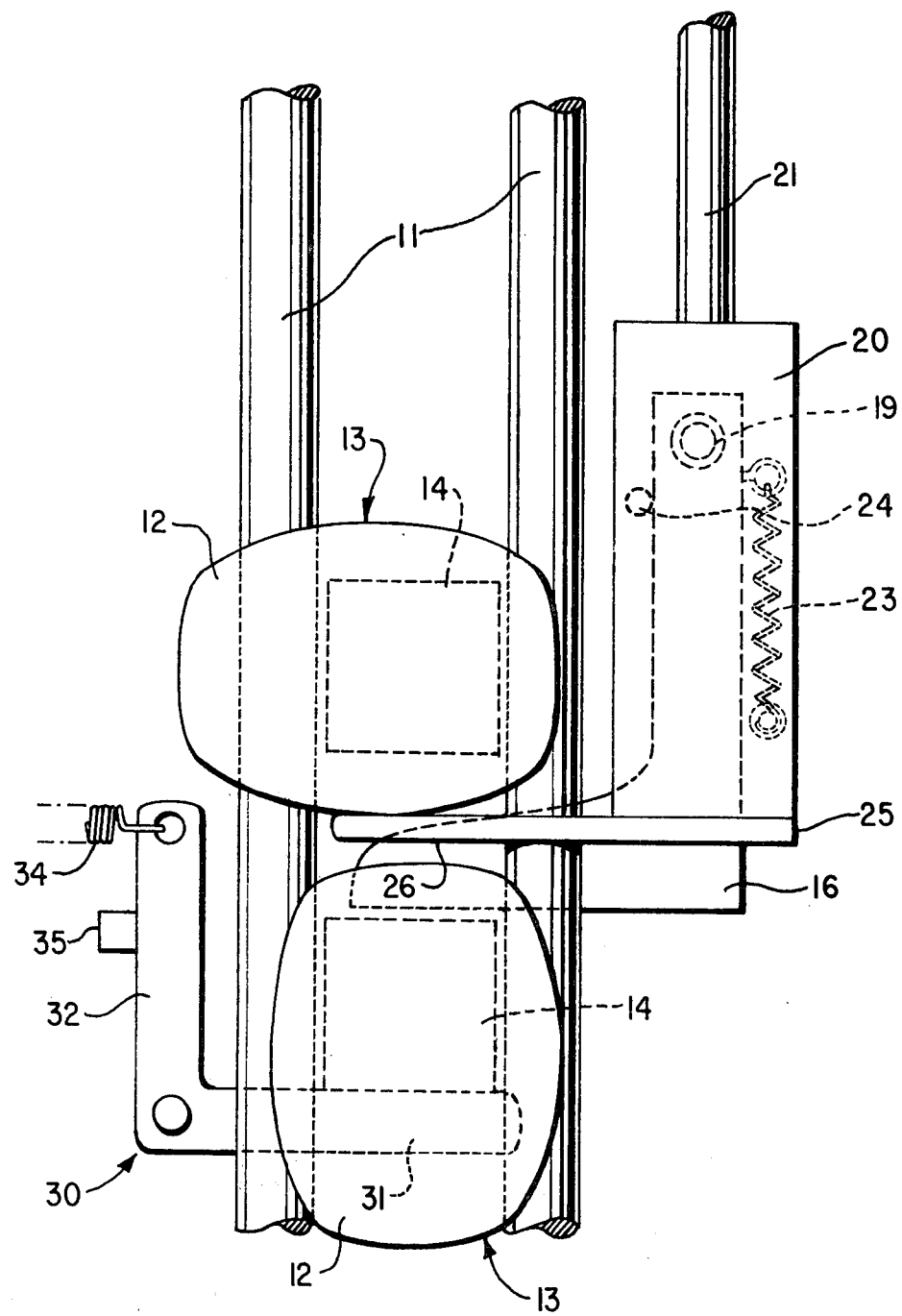
FIG. 3 is a fragmentary plan view of the loading gates of the system.

The shanks 14 of the spikes are square in section having four 90° spaced faces as can be seen in FIG. 3. Due to the random nature of the loading of the spikes 13 on to the top end of the chute 10, the spikes 13 can assume any of the four 90° positions as shown in FIG. 2. It is therefore necessary to provide a spike orientation system which will now be described.

At the loading area an electromagnet 40 is suspended above the guide rods 36, the electromagnet being connected on the end of a piston 44 which is extendable and retractable inside a cylinder 46. The cylinder 46 is a single action pneumatic cylinder, the magnet 40 being returnable to the retracted position by means of springs 48 extending between the magnet and cylinder.

An electric motor 50 is connected through a 4:1 reduction gear 52 to the lower end 54 of the cylinder 46. An air coupling 56 at the top of cylinder 46 permits rotation of the cylinder 46, piston 44 and the core of magnet 40. Associated with the output gear 57 of the motor 50 is a switch 58 and actuator 60 provided on the gear 57 so as to actuate switch 60 once for every revolution of the motor.

A light source 62 is mounted above, to one side of and forwardly of magnet 40 as can be seen by referring to both FIGS. 1 and 2. A light receiver 64 is mounted below, to the other side of and rearwardly of the magnet 40. The light transmitter and receiver are mutually aligned so that a beam of light emitted from transmitter 62 impinges on receiver 64, the beam passing close to the spike head 12 of the spike in the loading area. Only when the spike is orientated into the position shown in FIGS. 1 and 2 is the beam interrupted and this interruption is caused by the lip 66 of the spike head 12 projecting into the beam. Unless the spike is in the exact orientation shown the beam will be uninterrupted.

The rods 36, referred to above, form part of a spike retaining mechanism generally referenced 68 for holding the spike in the loading area. The retaining mechanism 68 comprises a spike stop 70 which is a generally U-shaped member the open mouth of which faces towards the guide chute 10 to receive the leading spike 13″ as it is pushed by the piston 21 past the gate 30 into the loading area. The stop 70 engages the shank 14 of the spike 13″ to define the limit of travel of the spike.

More importantly the stop 70 provides a flat face 71 against which one of the four faces of the shank 14 abuts as the spike 13″ is pushed against stop 70. The stop 70 and the guide rods 36 are connected through a member 72 to a piston 74 of a pneumatic cylinder (not shown).

Figure 4B:
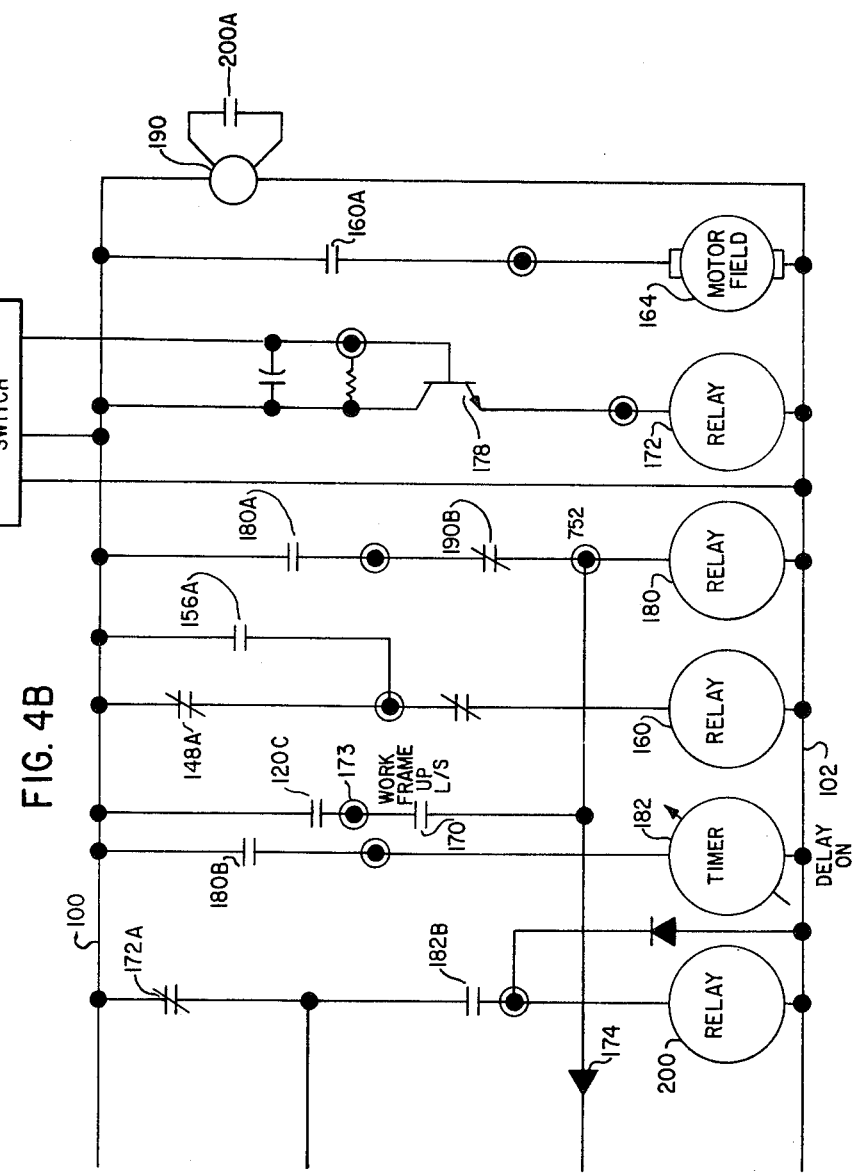

The operation of the system is controlled by an electrical circuit comprising various limit switches, relays and other components and these and the operation of the system will now be described with reference to FIG. 4. As indicated above, the system is primarily designed for use in an automatic spike driver which has a vertically movable frame. This frame is provided with limit switches denoting the frame "up" condition and the frame "down" condition and the operation of the system of the present invention is described in conjunction with the these limit switches. However, it should be appreciated that the spike orientation system of the present invention is not restricted to use in an automatic spike driver involving use of such a vertically movable frame.

The circuit is powered by a 12 volt dc supply operating across two main lines 100 and 102 between which various relays, timers and energizing circuits are connected as will be described below. The limit switch denoting the frame "down" position is referenced 104 and when this switch closes in the down position of the frame the solenoid 106 for loading cylinder 22 is energized by the 12 volt supply through the circuit comprising line 100, switch 120B, terminal 108, terminal 110 limit switch 104 and the line 102 to switch in loading cylinder 22. This causes the piston 21 to extend, pushing spike 13″ into the loading area and also permitting spike 13′ to move into the position formerly held by spike 13″. It should be noted that the piston 74 controlling the stop 70 has already been extended so that the stop 70 retains the spike in the correct loading position.

When the piston 21 is fully extended, a magnetic reed switch 112 mounted on the cylinder 22 is closed and the circuit from line 100 through switch 112, terminal 114, terminal 116, relay 118 and line 102 is complete thus energizing relay 118. The timer 120 is also energized via terminals 114 and 122. Energization of relay 118 causes energization of the solenoid 124 for actuating the piston 44 and cylinder 46. The circuit is completed through main line 100, connection 126, relay contacts 118A, connection 130 and line 102. Thus, the magnet 40 is extended to contact the head 12 of the spike in the loading area. At the same time, energization of relay 118 causes contact 118B to close thus completing the circuit from line 100 to line 102 through the magnet energization solenoid 134. Thus, the magnet 40 is energized and holds fast to the spike head 12.

After a predetermined interval (in the range 0.2 to 2 seconds), the timer 120 causes its various contacts to switch over. For example, the contacts 120A open to deenergize the circuit 124, causing retraction of the magnet under the action of the springs 48. Also, opening of timer contacts 120B causes deenergization of the circuit 140 controlling the stop piston 74. (Circuit 140 was previously energized through line 100, contacts 120B, connection 108, connection 110 and line 102). The cylinder 74 and stop 70 are, therefore, retracted. Opening of timer contacts 120B also breaks the connection to circuit 106 causing retraction of piston 44 from the loading area. The light source may be energized continuously or on intermittent basis and it is believed to be unnecessary to detail circuitry ensuring that the light beam is present when the spike in the loading area has been lifted by the magnet 40. It should be understood that the distance that the spike is lifted by the magnet is very small as can be seen in FIG. 2 which shows the spike head in the raised and load positions. The reason for lifting the spike is to permit retraction of guide rods 36 with the stop 70 smoothly so as not to cause the spike to waggle and possibly fall off the magnet.

As described above, because of the square cross-section of the spikes, they can have four orientations as they are held against stop 70; namely the correct orientation and three incorrect orientations 90°, 180° and 270° rotated with respect to the correct position.

If the spike in the loading area happens to be in the correct orientation, the light beam will be interrupted and the output from the photocell 141, forming part of the light receiver 64, which output appears on line 142, will disappear, thus causing the base of transistor of 144 to be correctly biased through resistor 146 causing conduction of that transistor and energization of relay 148.

Energization of relay 148 causes relay contacts 148A to open. At the same time the actuator 60 is disposed directly under actuating switch 58 so that the switch is "off" and, therefore, no signal appears on line 152. Thus the base of transistor 154 is incorrectly biased for conduction and relay 156 is, therefore, not energized. As a result relay normally open contacts 156A remain open. Thus, relay 160 is not energized because both parallel lines, one through normally closed contacts 148A and the other through normally open contacts 156A, are open. Thus, relay contacts 160A remain open preventing energization of motor field circuit 164.

If, however, the spike is not in the correct orientation, i.e. if the spike is in a 90°, 180° or 270° rotated position with regard to the correct position, an output signal of photocell 141 is present on line 142 which biases transistor 144 into cutoff, thus deenergizing relay 148 and closing contacts 148A to energize relay 160 which in turn causes closing of relay contacts 160A and energization of motor coil 164. Thus, the motor starts rotating the magnet core and spike. When the approximately correct orientation is reached, transistor 144 is switched on as described above and this causes energization of relay 148 and opening of contacts 148A. However, relay 160 remains energized through relay contacts 156A until actuator 60 passes under actuating switch 58 at which point contacts 156A are opened to cause the motor to stop. The spike is held in this position until the frame carrying the spike guide tube, setter and drive head is returned to the "up" position in which position, the upper portion of the guide tube partly receives the shank 16 of the spike in the loading area. A limit switch 170 carried by the frame is closed in the up position and this closes the circuit from line 100 through connection 173, diode 174 to solenoid 124 for extending the piston 44, magnet 40 and spike, the spike entering the delivery tube.

Relay 180 is also energized. Energization of 180 causes timer 182 to start. After a timed interval timer contact 182A will open deenergizing relay 118. This will cause timer 120 to reset opening contact 120C. Power is maintained on solenoid 124 through connection 752. This maintains the delivery cylinder in the extended position. It will be noticed that contact 118B has now opened since relay 118 has been deenergized. This allows the spike to fall from the magnet into the tube while the delivery cylinder 46 is still extended. This was necessary because if the magnet and the solenoid 124 were deenergized at the same time, the residual magnetism would pull the spike out of the tube as the cylinder retracted under the influence of the springs.

Contact 120B of timer 120 has now closed. If contact 190A of timer 190 were not in this line, the stop cylinder would extend. This is not desirable at this time since the delivery cylinder is still extended. To prevent this extension timer 190 is included. When the delivery cylinder extended, a magnetically operated proximity switch 176 is actuated, switching off transistor 178 and deenergizing relay 172. This causes contact 172A to close and relay 200 to energize through timer contact 182B that was closed previously. Contact 200A of relay 200 closes causing timer 190 contacts to change state. Timer 190 is a delay off timer meaning that as soon as power is applied the contacts change state. When power is removed the contacts remain in this state for the desired time interval. Contact 190A opens at the same time that 120B closes. This prevents the stop cylinder solenoid from energizing and extending the stop cylinder into the extended delivery cylinder. At the same time, contact 190B opens causing 180 to deenergize. This opens contact 180A, deenergizing solenoid 124 and allowing the retraction of the delivery cylinders under the influence of the springs. Contact 180B opens at this time resetting timer 182. This causes contact 182B to open deenergizing relay 200. This removes power from timer 190. Since this is a delay off timer its contacts are maintained for the timed interval after power is removed. This means that contact 190A is maintained open thereby holding the stop cylinder in the retracted position. This allows time for the delivery cylinder to retract. After the timed interval contact 190A closes, energizing the stop cylinder solenoid 140. This extends the stop cylinder. This completes the sequence.

It should be apparent that changes may be made to the spike orientation system described without departing from the spirit and scope of the invention. For example, instead of a visible light source and detector an infrared link can be used to detect presence of the lips of the spikes.

What I claim as my invention:

1. Apparatus for orientating a railway spike of the type having a head provided with a projecting lip so that the lip is aligned substantially in a predetermined angular position with respect to a vertical axis extending axially through the spike, the apparatus comprising holding means for holding the spike substantially vertically, drive means coupled to the holding means for rotating the spike about its vertical axis, a first sensor and a second sensor, the first sensor sensing the angular position of the lip as the spike is being rotated and the second sensor sensing every 90° rotation of the spike with respect to a reference position, the first and second sensors being coupled to the drive means to cause deenergization of the drive means when the first sensor indicates the projecting lip has reached the predetermined position and when the second sensor indicates that a 90° position has been reached.

2. Apparatus according to claim 1, wherein the holding means comprises an electromagnet engageable with the head of the spike.

3. Apparatus according to claim 1 or 2, wherein the first sensor comprises a light source and light detector defining a light path extending through the locus defined by the lip of the spike as it is rotated, the orientation of the light path determining the predetermined angular position of the lip.

4. Apparatus according to claim 2 comprising means for de-energizing the electromagnet when the lip of the spike is in the predetermined position.

5. Apparatus for orienting a railway spike of the type having a rectangular shank defining four 90° faces and a head at an end of the shank provided with a projecting lip which overhangs one of the faces of the shank, the apparatus serving to align the lip in a predetermined angular position and the apparatus comprising guide and feed means cooperating with the shank to orientate the spike in a random one of four 90° angular positions corresponding, respectively, to the faces of the shank as the spike is being fed to the apparatus, holding means arranged proximate the guide and feed means to engage and hold the spike vertically in the random one of four 90° angular positions, drive means coupled to the holding means for rotating the spike means coupled to the holding means for rotating the spike about its vertical axis, a first sensor and a second sensor, the first sensor sensing the angular position of the lip as the spike is being rotated, and the second sensor sensing every 90° rotational position of the spike from its random one of four 90° angular positions, the first and second sensors being coupled to the drive means to cause de-energization of the drive means when the first sensor indicates the lip has reached the predetermined angular position and when the second sensor indicates that a 90° position has been reached.

6. Apparatus according to claim 5, wherein the holding means comprises an electromagnet engageable with the head of the spike.

7. Apparatus according to claim 5 or 6, wherein the first sensor comprises a light source and light detector defining a light path extending through the locus defined by the lip of the spike as it is rotated, the orientation of the light path determining the predetermined angular position of the lip.

8. Apparatus according to claim 6, comprising means for de-energizing the electromagnet when the lip of the spike is in the predetermined position.

* * * * *